(12) United States Patent
Wang et al.

(10) Patent No.: US 6,280,809 B1
(45) Date of Patent: Aug. 28, 2001

(54) LUMINOUS DISK

(75) Inventors: Shaw-Jong Wang, Hsinchu; Chi-Jung Shen, Taipei; Hsin-Hua Chang, Chung Li, all of (TW)

(73) Assignee: Ritek Corporation (TW)

( * ) Notice: Subject to any disclaimer, the term of this patent is extended or adjusted under 35 U.S.C. 154(b) by 0 days.

(21) Appl. No.: 09/399,326

(22) Filed: Sep. 20, 1999

(30) Foreign Application Priority Data

Aug. 7, 1999 (TW) .................................................. 88213370

(51) Int. Cl.$^7$ ........................................................ B32B 3/02
(52) U.S. Cl. ..................... 428/64.1; 428/64.4; 428/457; 428/690; 428/913; 430/270.11; 430/495.1; 430/945; 369/283; 369/288
(58) Field of Search .................................. 428/64.1, 64.2, 428/64.4, 457, 690, 913; 430/270.11, 495.1, 945; 369/275.1, 283, 288

(56) References Cited

U.S. PATENT DOCUMENTS 5,608,715 * 3/1997 Yokogawa ............................ 369/275.1
6,160,346 * 12/2000 Vlegger ................................. 313/512

* cited by examiner

*Primary Examiner*—Elizabeth Evans
(74) *Attorney, Agent, or Firm*—Finnegan, Henderson, Farabow, Garrett & Dunner, L.L.P.

(57) ABSTRACT

A luminous disk is disclosed in this invention. The luminous disk comprises a disk lamination and a light emitting lamination. The disk lamination at least comprises a substrate and a metallic reflecting layer. The light emitting lamination at least comprises an electroluminescence section having a first side plane and a second side plane, and a biasing section for applying an external electrical signal onto the first and the second side planes so as to make the electroluminescence section luminesce. Basing on the above structure, a new disk having a redoubled effect is available.

7 Claims, 3 Drawing Sheets

LUMINOUS DISK

BACKGROUND OF THE INVENTION

1. Field of the Invention

The invention relates to a luminous disk, more particularly to an optical disk that one side thereof is capable of storing digital data while the other side thereof is capable of emitting light.

2. Description of the Prior Art

Optical disks extensively serve as storage medium for storing video or audio data. One side of the optical disk serves as a readable side being read out data by a laser light, and is usually covered by a transparent protective layer. The other side of the optical disk is usually provided with various printed patterns indicating information concerning the optical disk, such as title and content, and for decorating the appearance of the optical disk.

Even though advertising techniques are progressing, it has been difficult to establish surface printing style that makes a deep impression on the customer. The pattern presented on the surface of the optical disk also has such a drawback and becomes particularly apparent in light of its attribution of serving as a medium for video and audio.

SUMMARY OF THE INVENTION

The object of this invention is to provide a luminous disk so as to increase the application value of the optical disk and thus to provide a multi-use disk.

To achieve the above object, the luminous disk in accordance with this invention comprises a disk lamination including a flat substrate and a metallic reflecting layer formed on one side plane of the substrate; and a light emitting lamination, superposed on one side of the metallic reflecting layer opposite to the substrate, for emitting light upon reception of an applied external electrical signal, including an electroluminescence section having a first side plane and an opposite second side plane, which can luminesce in case the external electrical signal is applied on the first and the second side planes; and a biasing section for receiving and applying the external electrical signal onto the first and the second side planes of the electroluminescence section.

By means of the above luminous disk, the optical disk will increase its value in application or reserve due to its light emitting function. For example, the optical disk can serve as a light emitting element when it is not being played, such as a reflecting elements for road, a signboard, an indoor lighting element, an alarm light, or a decorating light. The optical disk can also be simultaneously lighted and played by using an appropriate arrangement to increase its added value.

Moreover, the light emitting landnation can also be properly modified so as to present a light of particular shape, in partial disk surface, or of different colors. Furthermore, the optical disk can also periodically emit light in a cooperation with a proper driving device. Therefore, the disk according to this invention will provide an essential element for various applications and thus increase the value of the disk.

DESCRIPTION OF THE INVENTION

Figure 1:
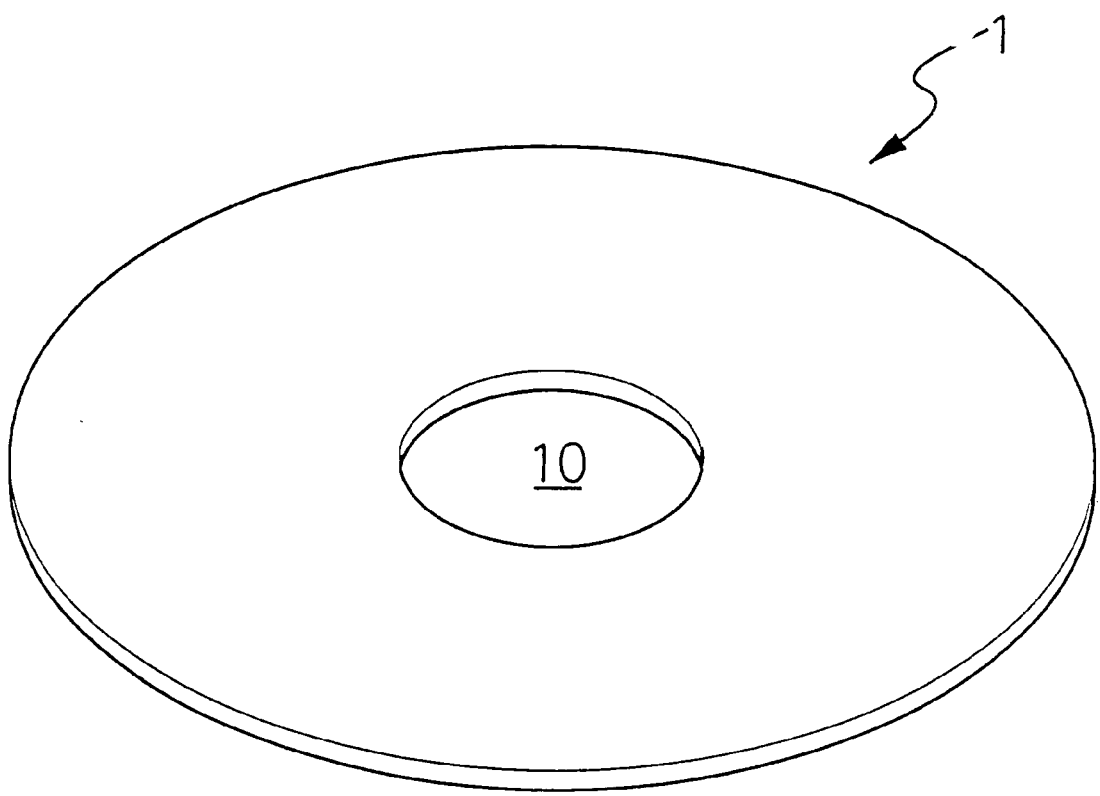
FIG. 1 is a perspective view of a luminous disk in accordance with this invention.
Figure 2:
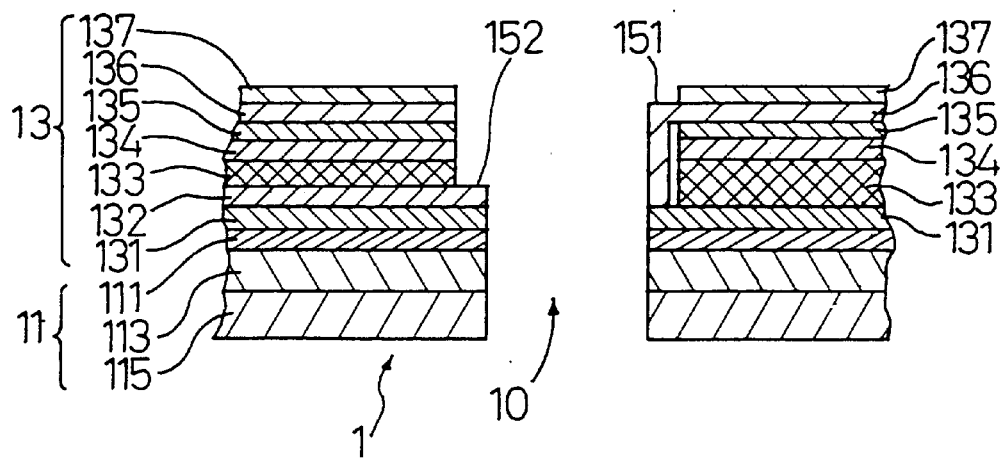
FIG. 2 is an enlarged partial section view of the disk according to a first embodiment of this invention.
Figure 3:
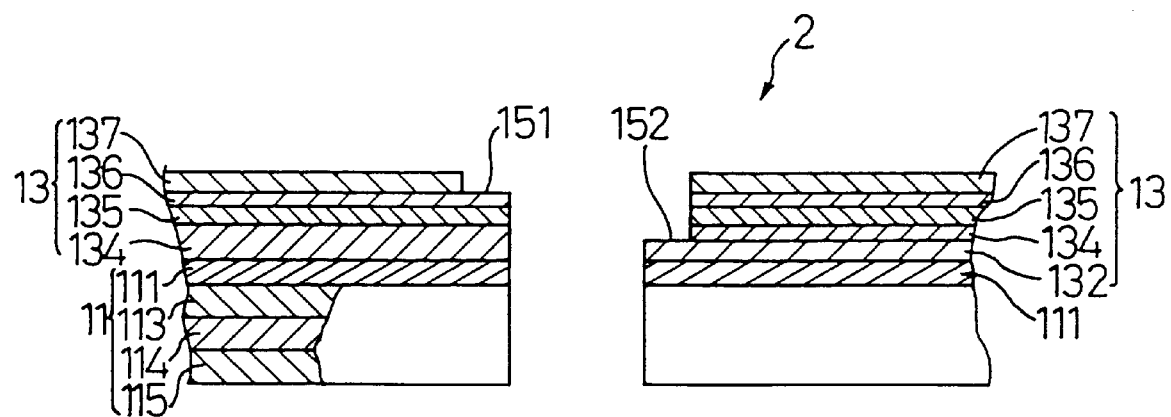
FIG. 3 is an enlarged partial section view of the disk according to a second embodiment of this invention.

In the following description referring to the attached drawings, the same reference number in each embodiment indicates the same element for the sake of simplification. FIG. 1 is a perspective view showing the appearance of the disk according to this invention. As shown in FIG. 1, the luminous disk 1 disclosed in this invention is substantially the same with the prior art disk in appearance. FIG. 2 shows a partial section view of a luminous disk 1 in accordance with this invention. For easy recognition, each element is not to scale. According to FIG. 2, the luminous disk 1 disclosed in this invention comprises a disk lamination 11 and a light emitting lamination 13. Moreover, a hole 10 is formed in the center of the disk 1 to be clamped for playing. The disk lamination 11 comprises a flat substrate 113, a metallic reflecting layer 111 formed on the upper side plane of the substrate 113, and a transparent protecting layer 115 formed on the lower side plane of the substrate 113. The substrate 113 is generally constructed by a transparent plastic material. A pattern representative of a digital data can be formed on the lower side plane of the substrate by pressing so as to store digital data. In such a case, the disk lamination 11 serves as a CD-ROM. However, the disk lamination 11 can also be constructed as the structure shown in FIG. 3. As shown in FIG. 3, the disk lamination 11 comprises a substrate 113, a metallic reflecting layer 111 formed on the upper side plane of the substrate 113, a dye layer 114 formed on the lower side plane of the substrate 113, and a protecting layer 115 covering the dye layer 114. In this case, the pattern corresponding to digital data will be formed on one side plane of the dye layer 114 upon emitting of an external laser light after the luminous disk 1 being finished. In such a structure, the disk lamination 11 will serve as a CD-R.

The light emitting lamination 13 comprises an electroluminescence section and a biasing section. The electroluminescence section has an upper first side plane and an opposite lower second side plane for receiving an external electrical signal applied via the biasing section. The electroluminescence section shown in FIG. 2 comprises a dielectric layer 134 and a fluorescent layer 135. The biasing section shown in FIG. 2 comprises a distributing layer 132 and a lower electrode layer 133 located under the lower side plane of the electroluminescence section, and a transparent electrode layer 136 located above the upper side plane of the electroluminescence section. The light emitting lamination 13 shown in FIG. 2 further comprises a lower protection layer 131 located below the distributing layer 132 and an upper protecting layer 137 located above the transparent electrode layer 136. The distributing layer 132 and the transparent electrode layer 136 respectively has an exposed upper surface for forming a second pad 152 and a first pad 151 which are used to interface to an external electrical signal.

The upper and lower protecting layers 131 and 137 are used to protect the light emitting lamination and can be constructed by any proper transparent protecting material such as polymer cured by ultraviolet ray. The distributing layer 132 is a layer of metallic material and can be formed by plating or any other proper method. The distributing layer 132 has an exposed upper surface located at the left edge of the light emitting lamination adjacent to the hole 10 for forming the second pad 152 used to interface to the external electrical signal. The other portion of the upper side plane of the distributing layer 132 contacts the lower electrode layer 133 and thus transmits the electrical signal received from the second pad 152 to the lower electrode layer 133.

The lower electrode layer 133 is constructed by metallic material and can be formed by printing or sputtering. The upper transparent electrode layer 136 is constructed by indium tin oxide (ITO) or indium zinc oxide (IZO) capable of passing light, and can be laminated on the side plane of the electroluminescence section by sputtering or printing. The upper electrode layer 136 also has an exposed upper surface located at the right edge of the light emitting lamination adjacent to the hole 10 for forming the first pad 151 used to interface to the external electrical signal. In the accumulation of the exposed pad 151, it is preferable to form an insulating material (not shown) between the pad 151 and the other layers. By means of the lower electrode layer 133 and the upper electrode layer 136, the external electrical signal received by the first and the second pads 151, 152 can be applied onto the first and the second side planes of the electroluminescence section.

The electroluminescence section can luminesce under the biasing of the electrical signal on the first and the second side planes and can be constructed by any proper fluorescence material or inorganic/organic type of electroluminescence material. The organic type of electroluminescence material can be one selected from the group consisting of organic molecule luminescence materials and organic polymer luminescence materials. The electroluminescence section can be formed by printing or sputtering in light of the material used. In the embodiment shown in FIG. 2, the electroluminescence section is consisted of a fluorescence layer 135 and a dielectric layer 134. The dielectric layer 134 serves as an insulating layer in case the electroluminescence section is constructed by inorganic type of material.

According to the above mentioned structure, the electroluminescence section will luminesce when the external electrical signal is applied thereon via the first and the second pads 151, 152, the distributing layer 132, the lower electrode layer 133, and the transparent electrode layer 136. Moreover, the luminous disk 1 itself can store digital data by means of its disk lamination 11 and thus can also serve as an optical disk to be played. However, during a playing of the luminous disk 1 with the disk lamination 11, the light emitting lamination can also be simultaneously biased by an external electrical signal via the first and the second pads 151, 152 and thus emits light.

FIG. 3 depicts an enlarged partial section view of a luminous disk 2 in accordance with a second embodiment of this invention. The luminous disk 2 shown in FIG. 3 also comprises a disk lamination 11 and a light emitting lamination 13 and the light emitting lamination 13 includes an electroluminescence section and a biasing section. The difference between the first and the second embodiments resides in simplification of biasing section. As shown in FIG. 3, the electroluminescence section is also consisted of a fluorescence layer 135 and a dielectric layer 134. The biasing section, however, only includes a distributing layer 132 located under the lower side plane of the dielectric layer 134 and a transparent electrode layer 136 located on the upper side plane of the fluorescence layer 135. An upper protecting layer 137 is also formed above the transparent electrode layer 136. In such an arrangement, the lower protecting layer 131 and the lower electrode layer 133 in the first embodiment are omitted and the metallic reflecting layer of the disk lamination 11 is further used as a lower electrode layer to apply electrical signal onto the lower second side plane of the electroluminescence section. Moreover, the first pad 151 is formed on the upper surface of the transparent electrode layer 136 which is adjacent to the left edge of the hole 10 and is not covered by the upper protecting layer 137. The second pad 152 is formed on the upper surface of the distributing layer 132 which is adjacent to the right edge of the hole 10 and is not covered by the upper layers. The selection of material and the method of constructing each layer are the same as those of the first embodiment. The external electrical signal is also supplied to the two side planes of the electroluminescence section via the first and the second pads 151, 152, the transparent electrode layer 136, the distributing layer 132 and the metallic reflecting layer 111.

Figure 4:
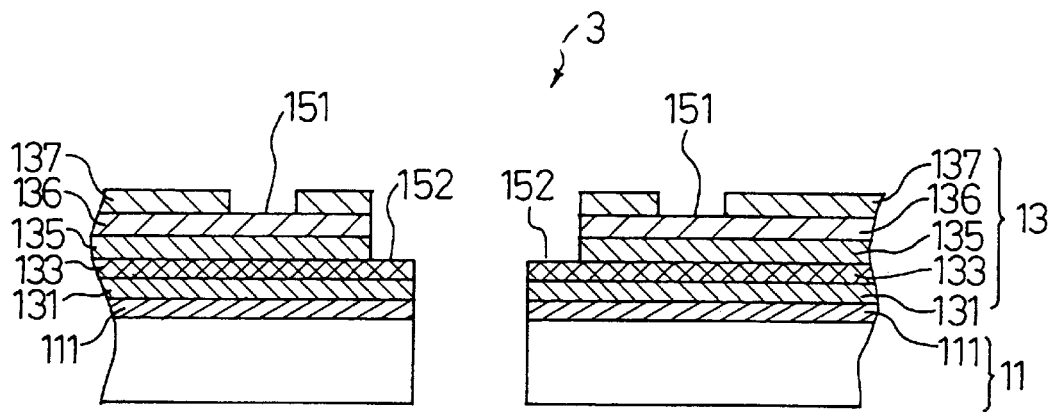
FIG. 4 is an enlarged partial section view of the disk according to a third embodiment of this invention.

FIG. 4 shows a partial section view of a luminous disk 3 in accordance with a third embodiment of this invention. As shown in FIG. 4, the disk 3 also comprises a disk lamination 11 and a light emitting lamination 13 and the later comprises a biasing section and an electroluminescence section. However, a distributing layer 132 and a dielectric layer 134 in the first embodiment is omitted. Thus, the light emitting lamination comprises a lower protecting layer 131, a lower electrode layer 133, a luminescence layer 135, a transparent electrode layer 136, and an upper protecting layer 137.

In this case, the electroluminescence section is constructed by an organic electroluminescence material. Moreover, the second pad 152 is formed on the upper surface of the lower electrode layer 133 which surrounds the hole 10 and is not covered by other upper layers. The first pad 151 is formed on the upper surface of the transparent electrode layer which is not covered by the upper protecting layer 137 and is located in a location vertically spaced away from the first pad 151. In such an arrangement, the electrical signal will be more correctly (due to the offset of the first and the second pads) supplied to the first and the second side planes of the electroluminescence section via the first and the second pads 151, 152, the lower electrode layer 133 and the transparent electrode layer 136 respectively.

Figure 5:
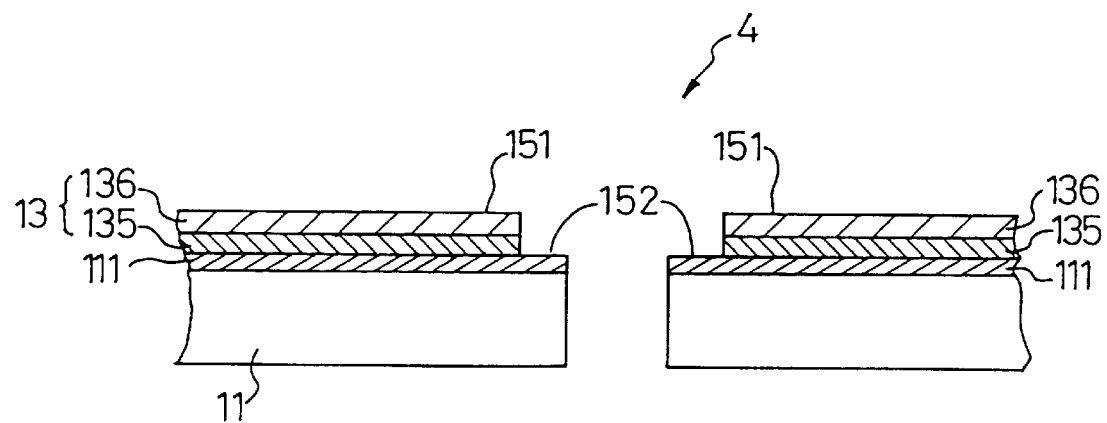
FIG. 5 is an enlarged partial section view of the disk according to a fourth embodiment of this invention.

FIG. 5 depicts a partial section view of a luminous disk 4 in accordance with a fourth embodiment of this invention. As shown in FIG. 5, the luminous disk 4 also comprises a disk lamination 11 and a light emitting lamination 13 and the later comprises a biasing section and an electroluminescence section. However, a lower protecting layer 131 and a lower electrode layer 133 is further omitted in comparison with the third embodiment. Moreover, an upper protecting layer 137 is also omitted in this embodiment and thus this embodiment shows a simplified structure of this invention. That is, the light emitting lamination comprises only a luminescence layer 135 and a transparent electrode layer 136.

In this case, the metallic reflecting layer 111 of the disk lamination 11 is further used as a lower electrode layer to apply an electrical signal to the lower second side plane of the electroluminescence section. The electroluminescence section is feasibly constructed by an organic electroluminescence material. Moreover, the second pad 152 is formed on the upper surface of the metallic reflecting layer of the disk lamination 11 which surrounds the hole 10 and is not covered by light emitting lamination 11. The first pad 151 is formed on the upper surface of the transparent electrode layer 136. In such an arrangement, the electrical signal will be applied to the first and the second side planes of the electroluminescence section via the first and the second pads 151, 152, the metallic reflecting layer 111 and the transparent electrode layer 136 respectively.

Based upon the above mentioned structure, the pattern of the light emitting lamination can also be modified in shape so as to obtain light of any desired shape. That is, the light emitting lamination 13 can entirely or partially cover the surface of the disk. Otherwise, the shape of the light emitting lamination can present a complete pattern in light of a combination with the pattern printed on the upper protecting layer 137. Moreover, the light emitting lamination 13 can also be consisted of several blocks each being constructed by a different luminescent color or pattern. In such a case, the light effect of the luminous disk according to this invention will be very fashionable when the several blocks of light emitting laminations are driven properly by several drivers respectively via corresponding pads. In view of the above, a product which has multipurpose, multi-use, high additional value, and low cost is available.

However, while various preferred embodiments of this invention have been illustrated and described, it should be understood that variations will be apparent to those skilled in the art. Accordingly, this invention is not to be limited to the specific embodiments illustrated and described, and the true scope and spirit of this invention are to be determined by reference to the following claims.

What is claimed is:

1. A luminous disk provided with a hole, comprising:
   a disk lamination including a flat substrate, a metallic reflecting layer, and a dye layer; wherein the metallic reflecting layer is formed on one side plane of the substrate and the dye layer is superposed on a side plane of the substrate opposite to the metallic reflecting layer; and
   a light emitting lamination, superposed on one side of the metallic reflecting layer opposite to the substrate, for emitting light upon reception of an applied external electrical signal, including:
   an electro-luminescence section having a first side plane and an opposite second side plane, which can luminesce in case the external electrical signal is applied on the first and the second side planes; and
   a biasing section, comprising a first electrode layer on the first side plane of the electro-luminescence section and a second electrode layer between the electro-luminescence section and the metallic reflecting layer, for receiving and applying the external electrical signal onto the first and the second side planes of the electro-luminescence section.

2. The disk as claimed in claim 1, wherein the dye layer is used for forming a pattern representative of encoded digital data under illumination of a light beam.

3. The disk as claimed in claim 1, wherein the biasing section further includes a distributing layer formed between the electro-luminescence section and the metallic reflecting layer and having an exposing area serving as a second pad interfacing with the external electrical signal.

4. The disk as claimed in claim 1, wherein the light emitting lamination further comprises a lower protecting layer formed between the metallic reflecting layer and the second electrode layer.

5. The disk as claimed in claim 1, wherein the electroluminescence section includes a luminescent layer constructed by an organic luminescence material.

6. The disk as claimed in claim 1, wherein the electroluminescence section includes a fluorescent layer constructed by an inorganic luminescence material and a dielectric layer adjacent to the fluorescent layer.

7. The disk as claimed in claim 1, wherein the biasing section further comprises a first and a second pad respectively formed on any exposed area of the first electrode layer and the metallic reflecting layer and located at different distances from the center of the hole for interfacing with the external electrical signal.

* * * * *